(12) United States Patent
Miyakoshi

(10) Patent No.: US 6,481,009 B1
(45) Date of Patent: Nov. 12, 2002

(54) PROGRAM VIEWING REGULATION DEVICE AND TELEVISION RECEIVER EQUIPPED WITH THE DEVICE

(75) Inventor: Takahiro Miyakoshi, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/346,920

(22) Filed: Jul. 2, 1999

(30) Foreign Application Priority Data

Jul. 3, 1998 (JP) ........................................... 10-189053

(51) Int. Cl.[7] .............................. H04N 7/16; H04N 5/44
(52) U.S. Cl. ............................ 725/28; 725/25; 348/734
(58) Field of Search .............................. 725/25, 27, 28; 348/734

(56) References Cited

U.S. PATENT DOCUMENTS 5,828,402 A * 10/1998 Collings ...................... 725/27
5,969,748 A * 10/1999 Casement et al. ............ 725/27
6,020,882 A * 2/2000 Kinghorn et al. ............. 725/28
6,094,194 A * 7/2000 Jackson ........................ 725/27

* cited by examiner

Primary Examiner—John Miller
Assistant Examiner—Scott Beliveau
(74) Attorney, Agent, or Firm—Rader, Fishamn & Grauer PLLC

(57) ABSTRACT

The invention provides a television receiver which comprises a setting key to be manipulated for setting RATING information, a decoder 4 for extracting RATING information from V-chip signal, a memory 5 for storing RATING information, and a control circuit 1 for reading RATING information from the decoder 4 when the user depresses the setting key and storing the read RATING information in the memory 5. This construction assures a facilitated procedure for setting RATING information and enables the user to set desired RATING information even if the user fails to understand the meanings of the symbols representing the RATING information, further enabling the user to reliably prohibit viewing of programs of a level contemplated by the user.

6 Claims, 5 Drawing Sheets

PROGRAM VIEWING REGULATION DEVICE AND TELEVISION RECEIVER EQUIPPED WITH THE DEVICE

FIELD OF THE INVENTION

The present invention relates to program viewing regulation devices which are adapted to check whether a prohibition is laid against viewing a program and to prohibit viewing the program upon finding the prohibition, and television receivers equipped with the device.

BACKGROUND OF THE INVENTION

In recent years, regulations called V-chip are to be formulated into a law in North America to prevent children from viewing television programs for adults which contain presentations involving violence or sexual expression. According to the V-chip regulations, it is required that viewing prohibiting information termed "RATING" and relating to the age limit for viewing, wording, etc. be superposed for each program on the television signal in the 21st horizontal section of vertical blanking period in the second field of the signal (see "EIA STANDARD"EIA-608-1994 ELECTRONIC INDUSTRIES ASSOCIATION).

In receivers for such television broadcast signals, the user manipulates the remote controller in advance to set RATING information relating to a particular program on which a prohibition is to be laid against viewing. The images of programs having RATING information corresponding to the set RATING information will not be displayed on the screen thereafter and can not be viewed even if such a program is selected by children.

FIG. 6 shows the RATING information setting frame 82 to be presented on the screen of the television receiver described for use in setting RATING information. The RATING information contained in the television broadcast signal is represented by L1 to L6 and A to F. L1 to L6 indicate viewing prohibition levels, and A to F indicate categories on which a prohibition is to be laid against viewing. The levels L2 to L6 are set, for example, according to the age; "L2" is a viewing prohibition level for children up to 14 in age, and "L5"is a prohibition level for children up to 7 in age. The age decreases gradually from L1 toward L6. As to the categories A to F, on the other hand, violence is represented, for example, by "C," and wording by "D."

The user manipulates the remote controller to display the RATING information setting frame 82 of FIG. 6 on the screen first, and further manipulates the controller to select levels for some of the categories to set RATING information.

With the conventional television receiver described, the user needs to select levels for some of the categories of the RATING information by manipulating the remote controller a plurality of times as stated above, hence the problem of a cumbersome procedure for setting the RATING information.

Further with the conventional television receiver described, the RATING information contained in the television signal is expressed by symbols such as "L1" to "L6" and "A" to "F", so that the user needs to understand what these symbols mean before setting. Thus there is the problem that the user is otherwise unable to set the desired RATING information.

Additionally even if the user understands the meanings of the symbols representing the RATING information before setting the information, the level set by the user as intended is likely to differ from the level actually realizing prohibition of viewing, with the resulting problem that children can not be reliably prohibited from viewing the program of the level contemplated by the user.

SUMMARY OF THE INVENTION

An object of the present invention is to provide a device for regulating viewing of programs which assures facilitated procedure for setting viewing prohibiting information such as the RATING information contained in the V-chip signal and which enables the user to set desired RATING information even if the user fails to understand the meanings of the symbols representing the prohibiting information, further enabling the user to reliably prohibit viewing of programs of a level intended by the user.

The present invention provides a program viewing regulation device which comprises:
  a manual key to be manipulated for setting viewing prohibiting information,
  memory means for storing viewing prohibiting information,
  information processing means for extracting viewing prohibiting information from the video signal of a program being viewed when the manual key is manipulated and storing the extracted viewing prohibiting information in the memory means, and
  control means operable when the viewing prohibiting information is stored in the memory means to check whether a prohibition is laid against viewing a program based on the stored viewing prohibiting information and viewing prohibiting information contained in the video signal of the program and to make it impossible to view the program upon finding the prohibition.

The present invention provides a television receiver having the program viewing regulation device.

The regulation device has an output terminal connected to a image display unit and a speaker unit. The programs are, for example, television broadcast programs, and the viewing prohibiting information is the RATING information contained in the V-chip signal.

When the user turns on the power supply switch of the television receiver, images of a program currently selected by the user are presented on the display unit, and the sound of the program is output from the speaker unit for the user to view the program. When the user depresses the manual key, for example, once upon judging that the program being viewed is of viewing prohibition level in this state, the information processing means extracts the RATING formation from the video signal of the program being viewed upon detecting the depression and stores the extracted RATING information in the memory means. In this way, the RATING information is set.

Accordingly, the user needs only to depress the manual key once as described above in setting the RATING information, hence a greatly facilitated setting procedure. Further when the user actually views a program and manipulates the manual key upon judging that the program is of viewing prohibition level, the RATING information of the program is extracted and set, so that the RATING information of intended level can be set by the user.

When the user thereafter selects a desired program, the control means checks whether a prohibition is laid against viewing the program based on the RATING information contained in the television broadcast signal of the program and the RATING information stored in the memory means, making it impossible to view the program upon finding the prohibition, or permitting viewing of the program upon finding no prohibition. Since the memory has stored therein the RATING information of the program actually viewed and judged to be of viewing prohibition level by the user, there will be no difference between the level set by the user and the level realizing prohibition of viewing, nor is it likely that a program of the viewing prohibition level contemplated by the user will be available for viewing.

More specifically, the device comprises a setting cancel key to be manipulated for canceling the setting of the viewing prohibiting information, and erase means for erasing the viewing prohibiting information stored in the memory means when the setting cancel key is manipulated.

When the user depresses the setting cancel key, for example, once to cancel the setting of the viewing prohibiting information according to this specific construction, the erase means erases the RATING information stored in the memory means upon detecting the depression. In this way, the setting of the RATING information is canceled. According, the user needs to depress the setting cancel key only once in canceling the set RATING information, hence a very simple cancellation procedure. With the set RATING information this canceled, the control means permits viewing of programs.

As another specific feature, the device comprises:
  erase means for erasing the viewing prohibiting information stored in the memory in response to a command, and
  setting-cancellation control means for commanding the information processing means to extract and store the viewing prohibiting information when the manual key is manipulated in a state ready for viewing programs, or for commanding the erase means to erase the viewing prohibiting information when the manual key is manipulated in a state not ready to view programs.

According to this specific construction, the user manipulates the manual key with the images of a program present on the image display unit and the sound of the program output from the speaker unit, whereon the information processing means starts to set the RATING information described in response to a command given by the setting-cancellation control means.

On the other hand, when the user manipulates the manual key with no images of a program presented on the image display unit and with no sound of the program output from the speaker unit, the erase means starts to cancel the setting of RATING information described in response to a command from the setting-cancellation control means.

As another specific feature, the device comprises:
  erase means for erasing the viewing prohibiting information stored in the memory in response to a command, and
  setting-cancellation control means for alternately commanding the information processing means to extract and store the viewing prohibiting information and commanding the erase means to erase the viewing prohibiting information, every time the manual key is manipulated.

According to this specific construction, the setting-cancellation control means gives a command alternately to the information processing means and to the erase means every time the user manipulates the manual key, thereby causing the information processing means to set the RATING information and causing the erase means to cancel the setting of the RATING information, alternately.

Further stated specifically, the device comprises a display key to be manipulated to display the setting of viewing prohibiting information, and image output means for outputting a setting frame signal for visually displaying the viewing prohibiting information stored in the memory means when the display key is manipulated.

When the user manipulates the display key of this specific construction to display the setting of viewing prohibiting information, the image output means feeds a setting frame signal to the image display unit upon detecting the manipulation. Consequently, a setting frame indicating the current setting of RATING information is displayed on the display unit. This enables the user to visually recognize the current setting of RATING information.

With the program viewing regulation device of the invention, viewing prohibiting information can be set by the user through a facilitated procedure, i.e., only by depressing the manual key, for example, once. Furthermore, desired viewing prohibiting information can be set even if the user fails to understand the meanings of symbols representing the viewing prohibiting information. Additionally, the device reliably prohibits viewing of programs of the level contemplated by the user.

DETAILED DESCRIPTION OF EMBODIMENTS

An embodiment of the invention as applied to a television receiver will be described in detail with reference to the drawings.

FIRST EMBODIMENT

Figure 6:
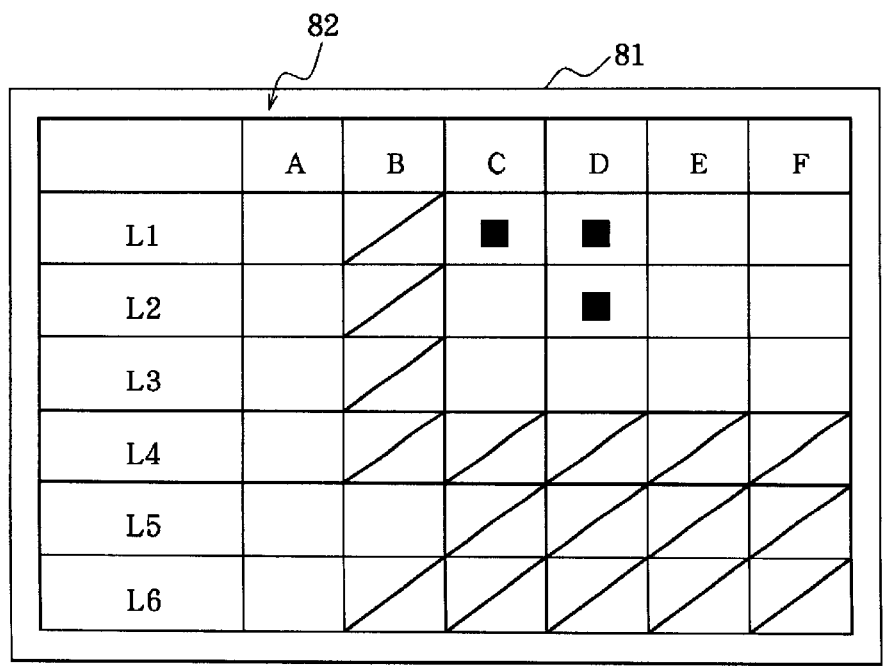
FIG. 6 is a view showing a RATING information setting frame.

The television receiver according to the present embodiment is adapted to receive television signals having a V-chip signal superposed thereon. The V-chip signal contains RATING information comprising L1 to L6 and A to F as seen in FIG. 6. The television receiver of this embodiment is further adapted to set and cancel RATING information and to display on the screen a RATING information setting frame showing the setting of RATING information.

Figure 1:
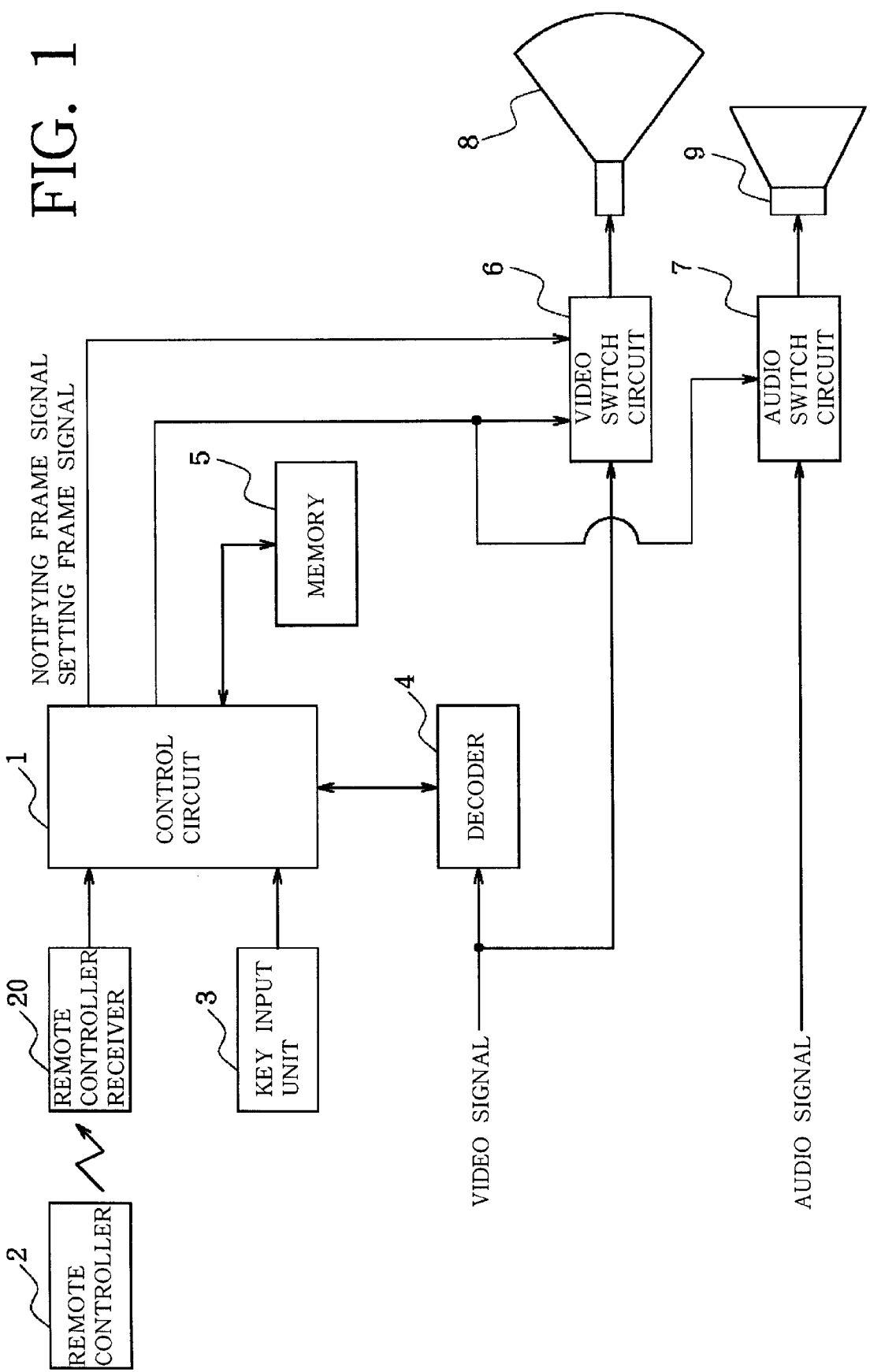
FIG. 1 is a block diagram showing the construction of a signal output unit of a television receiver embodying the invention.

With reference to FIG. 1 showing the television receiver, the television signal obtained by a tuner is first divided into a video signal and an audio signal. The video signal separated off is fed to a decoder 4 and to a video switch circuit 6. The decoder 4 extracts the RATING information contained in the V-chip signal.

On the other hand, the audio signal separated off is fed to an audio switch circuit 7.

Connected to the decoder 4 is a control circuit 1, which has connected thereto a remote controller receiver 20 for receiving remote control signals from a remote controller 2, a key input unit 3 having a plurality of manual keys, and a nonvolatile memory 5 such as a flash memory. The remote controller 2 and the key input unit 3 each have a setting key (not shown) for use in setting RATING information, a cancel key (not shown) for use in canceling the setting of RATING information, and a recognition key (not shown) for use in displaying the RATING information setting frame showing the setting of RATING information.

When given a RATING information setting command by the remote controller 2 or key input unit 3, the control circuit 1 stores the RATING information extracted by the decoder 4.

The control circuit 1 also checks in a specified cycle whether a prohibition against viewing is laid on a program selected by the user based on the RATING information extracted by the decoder 4 and the RATING information stored in the memory 5, and delivers to the video switch circuit 6 a notifying frame signal for showing on the screen that viewing is prohibited as will be described later upon finding the prohibition.

Further when given a RATING information setting display command by the remote controller 2 or key input unit 3, the control circuit 1 feeds to the video switch circuit 6 a setting frame signal for displaying on the screen the setting of RATING information as will be described below.

The video switch circuit 6 and the audio switch circuit 7 are under the control of the control circuit 1. The video switch circuit 6 is alternatively settable in a first state permitting passage of the video signal from the tuner, or in a second state permitting passage of the notifying frame signal or setting frame signal from the control circuit 1. The video switch circuit 6 is set in the first state in the case where the control circuit 1 finds that viewing is not prohibited as described above, permitting the video signal from the tuner to be delivered to a CRT 8, whereas when the control circuit judges that viewing is prohibited, the video switch circuit 6 is set in the second state, permitting the notifying frame signal or setting frame signal from the control circuit 1 to be delivered to the CRT 8.

On the other hand, the audio switch circuit 7 can be turned on or off. The circuit 7 is turned on in the case where the control circuit 1 finds that viewing is not prohibited as described above, permitting the audio signal from the tuner to be output to the speaker 9, whereas when the control circuit judges that viewing is prohibited, the audio switch circuit 7 is turned off to discontinue the delivery of audio signal to the speaker 9.

Figure 2:
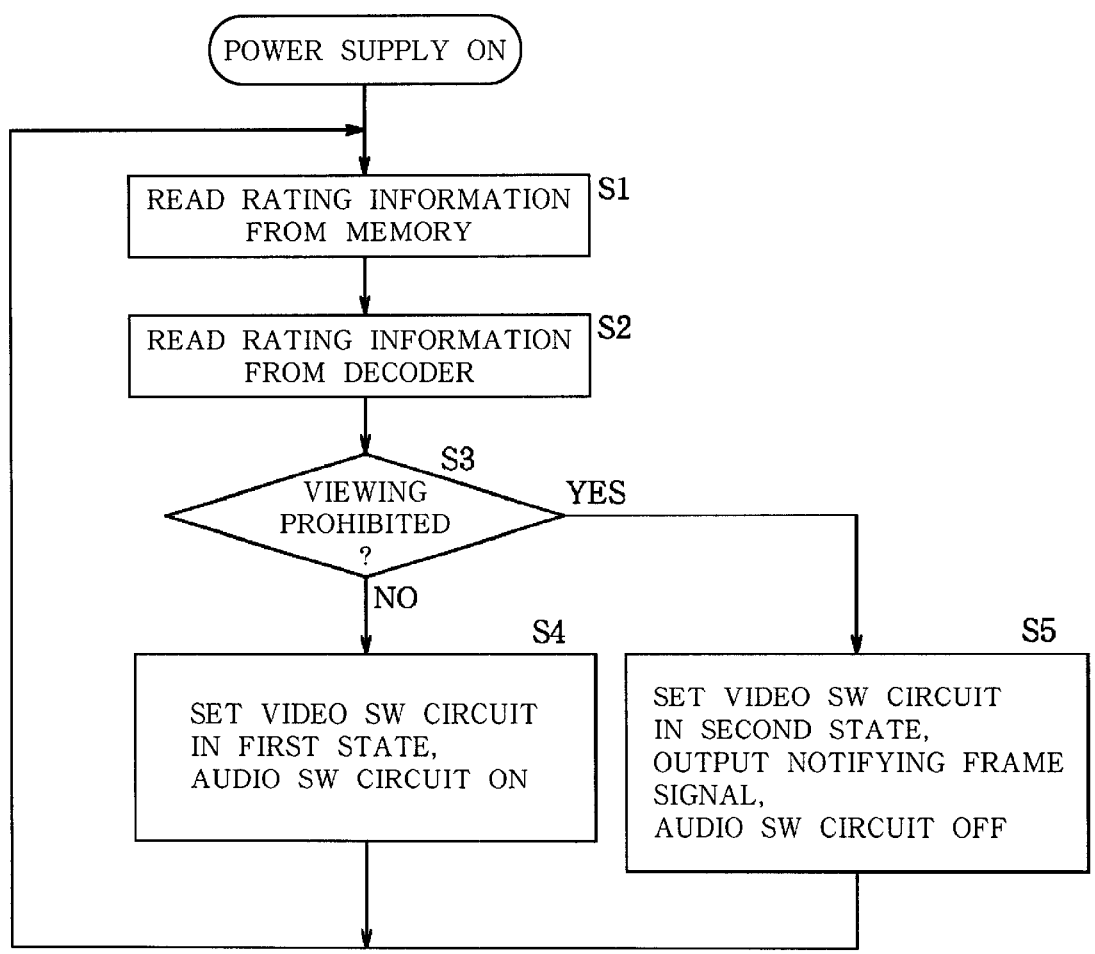
FIG. 2 is a flow chart showing a procedure for presenting a program on the television receiver.

FIG. 2 shows a specific procedure to be performed by the control circuit 1 for showing a program. This procedure is repeated in a predetermined control cycle when the power supply switch of the television receiver is turned on.

When the television receiver power supply switch is turned on, the RATING information currently written to the memory 5 is read in step S1, followed by step S2 in which the RATING information of the program currently selected by the user is read from the decoder 4. An inquiry is then made in step S3 as to whether a prohibition is laid on the currently selected program against viewing based on the RATING information read in step S1 and the RATING information read in step S2. When the inquiry is answered in the negative, the sequence proceeds to step S4 to set the video switch circuit 6 in the first state and turn on the audio switch circuit 7. Consequently, an audio signal is fed to the CRT 8 to display images of the currently selected program on the screen of the CRT 8, and an audio signal is fed to the speaker 9 for the speaker 9 to deliver the sound of the current program, permitting the user to view the program.

Figure 5:
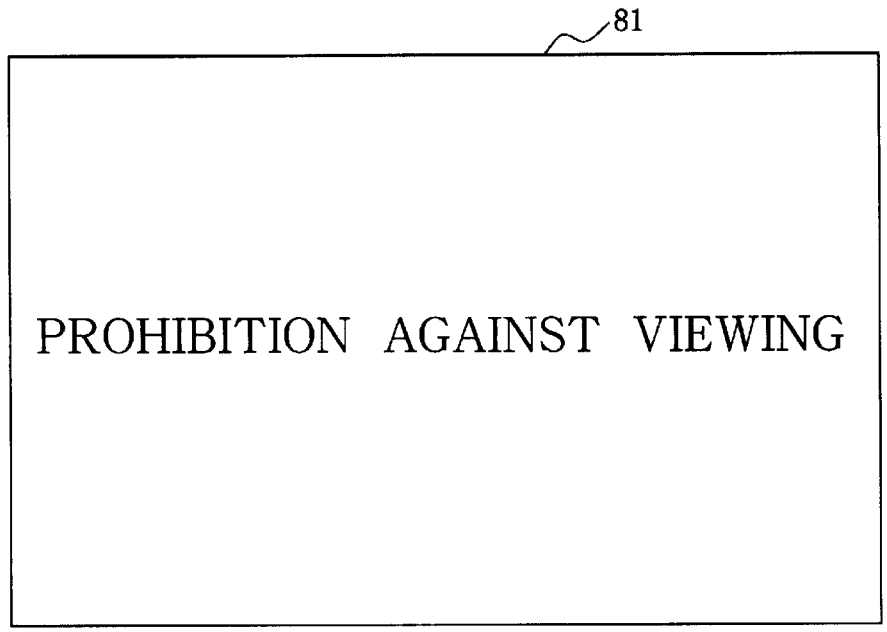
FIG. 5 is a diagram showing a screen when a program is selected on which a prohibition is laid against viewing.

On the other hand, if the inquiry of step S3 is answered in the affirmative, step S5 follows to set the video switch circuit 6 in the second state, permitting the control circuit 1 to deliver a notifying frame signal to the circuit 6, and to turn off the audio switch circuit 7. As a result, the notifying frame signal is fed to the CRT 8, which shows that viewing is prohibited on its screen 81 as seen in FIG. 5, and the delivery of the audio signal to the speaker 9 is discontinued for the speaker 9 to cease outputting the sound of the program, making it impossible to view the program.

Next with reference to FIG. 3, a detailed description will be given of a RATING information setting-cancellation procedure which is a feature of the present invention. This procedure is executed repeatedly in a predetermined control cycle when the power supply switch of the television receiver is turned on.

Figure 3:
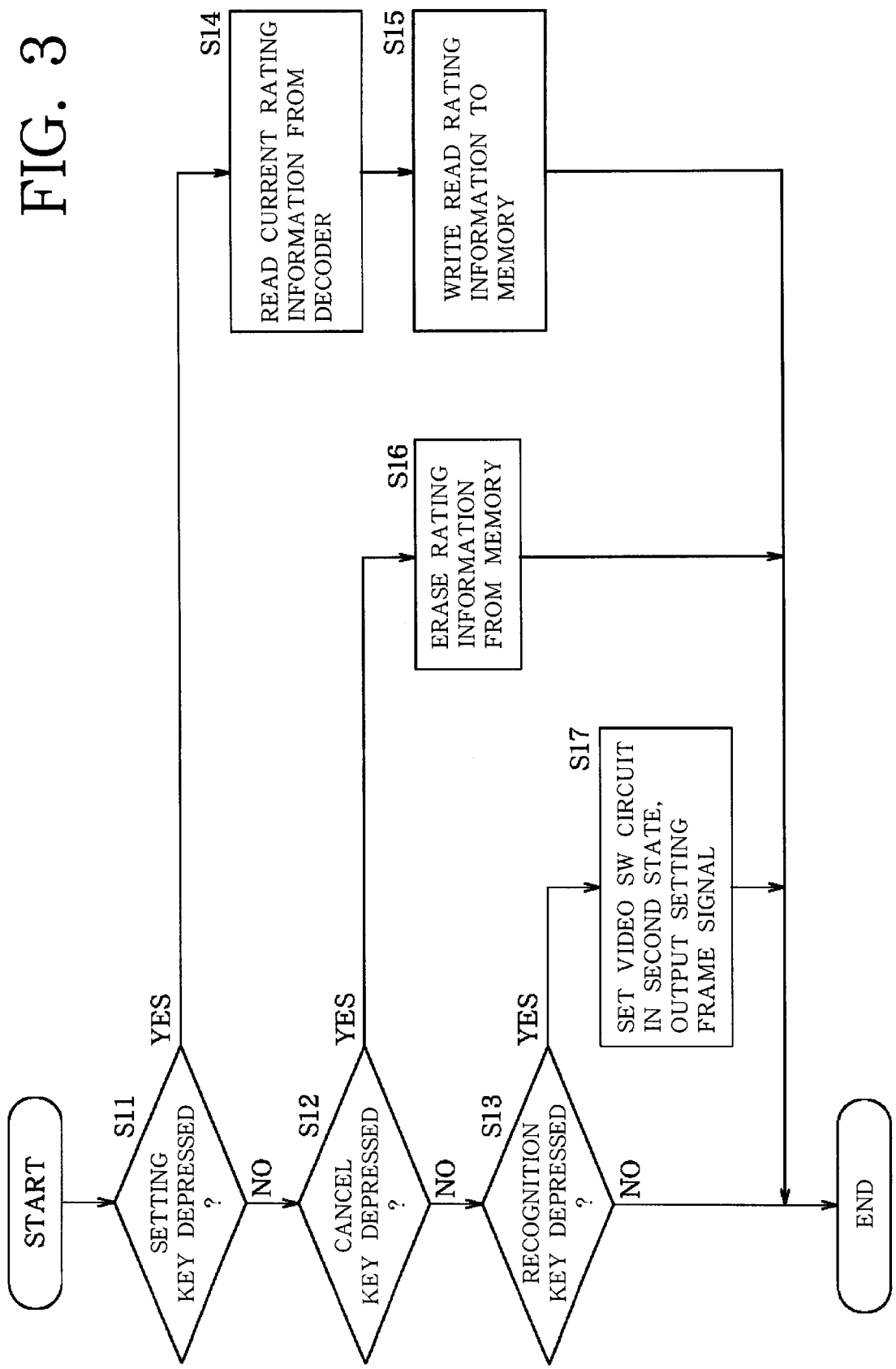
FIG. 3 is a flow chart showing a RATING information setting-cancellation procedure according to a first embodiment.

With reference to FIG. 3, an inquiry is first made in step S1 as to whether the setting key has been depressed. When the user depresses the setting key to set RATING information, an affirmative answer is given in this step, and the sequence proceeds to step S14.

The RATING information of the program currently selected is read by the decoder 4 in step S14, and thereafter stored in the memory 5 in step S15 to complete the procedure. In this way, the RATING information is set.

When the inquiry of step S11 is answered in the negative, on the other hand, step S12 follows to inquire whether the cancel key has been depressed. When the user depresses the cancel key to cancel the current setting of RATING information, an affirmative answer is given, followed by step S16 in which the RATING information written to the memory 5 is erased to complete the procedure. Thus, the setting of RATING information is canceled.

If the inquiry of step S12 is answered in the negative, on the other hand, step S13 follows to inquire whether the recognition key has been depressed. When the user depresses the recognition key to display on the screen the RATING information setting frame showing the setting of RATING information, an affirmative answer is given. Step S17 then follows to set the video switch circuit 6 in the second state and feed a setting frame signal to the video switch circuit 6, whereby the procedure is completed. Consequently, the screen 81 of the CRT presents the same RATING information setting frame 82 as is displayed on the conventional television receiver in setting RATING information as seen in FIG. 6.

If the user depresses the setting key on the television receiver according to the present embodiment while the program being shown has RATING information including level L1 for category C and level L2 for category D, with the sound of the program output from the speaker, the inquiry of step S11 is answered in the affirmative, and the RATING information including level L1 for category C and L2 for category D is written to the memory in step S15, during repeated execution of the procedure of FIG. 3.

During repeated execution of the procedure of FIG. 2, step S3 finds that a prohibition against viewing is laid on the program currently being shown on the screen, and step S5 indicates the prohibition on the screen as shown in FIG. 5 and ceases outputting the program sound from the speaker 9, making it impossible to view the program.

Step S3 of FIG. 2 thereafter judges that a prohibition against viewing is laid on the particular program subsequently selected by the user, rendering the program unavailable for viewing, not only in the case where that program has RATING information of level L1 for category C or RATING information of level L2 as to category D, but also when the program has RATING information of level L1 for category D which level is stricter than level L2 in age limit.

With the television receiver according to the resent embodiment, RATING information can be set by the user through a facilitated procedure, i.e., only by depressing the setting key once as described above.

While viewing a particular program presented on the screen of the CRT 8, the user depresses the setting key when judging that the program is of viewing prohibition level, whereby the RATING information of the on-screen program can be set upon extraction from the V-chip signal. This enables the user to set the desired RATING information even if failing to understand the meanings of the symbols representing the RATING information, i.e., L1 to L6 and A to F.

Furthermore, since the information set is the RATING information of the program actually viewed by the user and found to be of viewing prohibition level, there will be no difference between the level set by the user and the level realizing prohibition of viewing, nor is it likely that a program of the viewing prohibition level contemplated by the user will be available for viewing.

When the user thereafter depresses the cancel key, the inquiry of FIG. 3, step S12 is answered in the affirmative, and the RATING information written to the memory 5 is erased in step S16. As a result, the inquiry of FIG. 2, step S3 is answered in the negative, and no program can be viewed. Thus, the set RATING information can be canceled merely by depressing the cancel key once, hence a very simple cancellation procedure.

Further when the recognition key is depressed, an affirmative answer is given to the inquiry of FIG. 3, step S13, and the RATING information setting frame 82 shown in FIG. 6 is displayed on the screen 81 of the CRT 8 in step S17. In this frame 82, level L1 is marked for category C, and levels L1 and L2 are marked for category D. This enables the user to visually recognize the current setting of RATING information.

SECOND EMBODIMENT

The television receiver according to the first embodiment has the setting key for setting RATING information and the cancel key for canceling the setting of RATING information, while the television receiver of this embodiment has a single setting-cancellation key for setting or canceling RATING information. The signal output unit of the television receiver of this embodiment has the same circuit construction as that of the first embodiment shown in FIG. 1 and will not therefore be described again.

Figure 4:
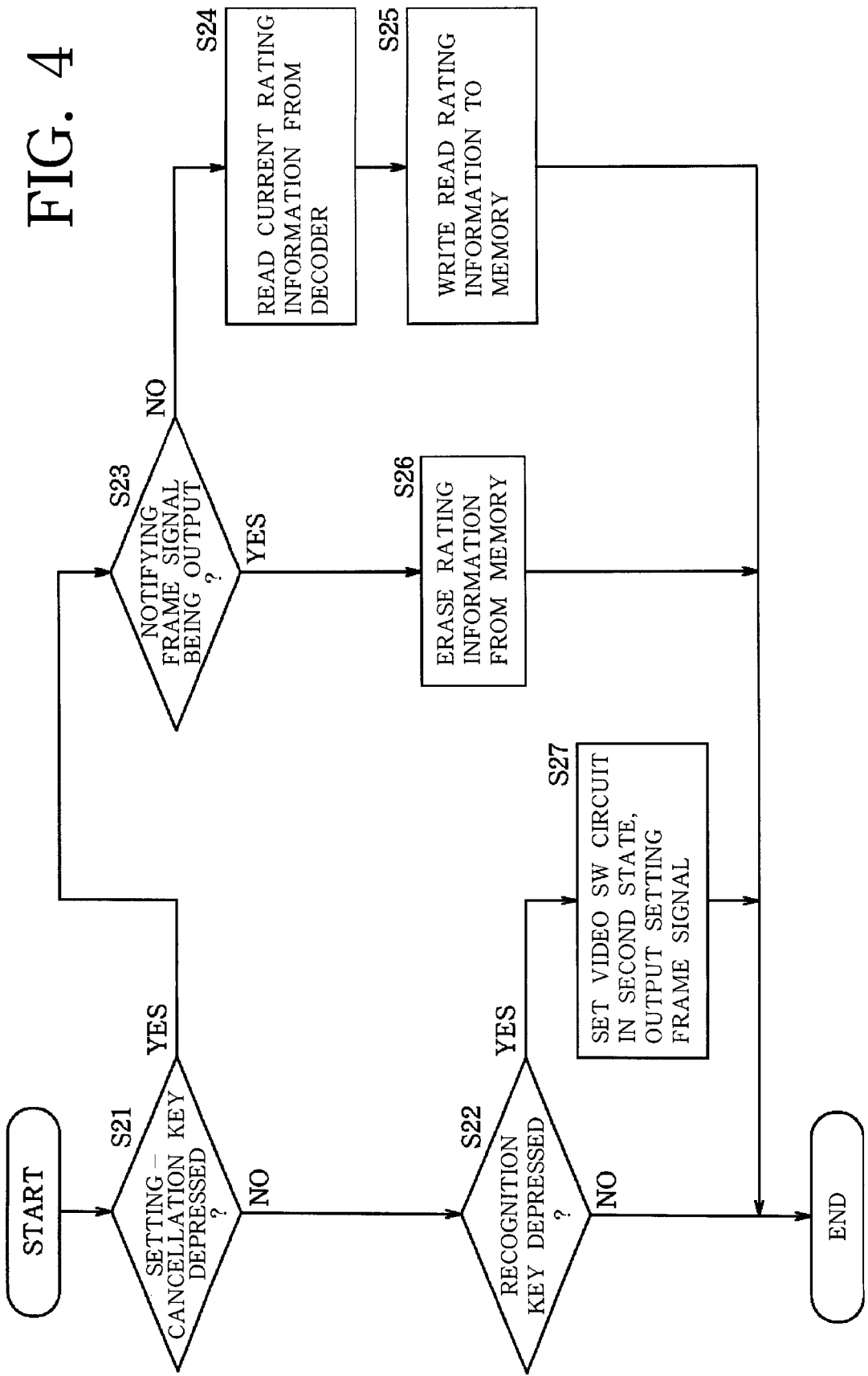
FIG. 4 is a flow chart showing a RATING information setting-cancellation procedure according to a second embodiment.

FIG. 4 shows the RATING information setting-cancellation procedure for the present receiver.

As illustrated, an inquiry is made first in step S21 as to whether the setting-cancellation key has been depressed. When the user depresses the key to set or cancel RATING information, an affirmative answer is given, and step S23 follows.

An inquiry is made in step S23 as to whether a notifying frame signal is being output. When the user depresses the setting-cancellation key while the program currently selected is being shown on the screen of the CRT 8, the inquiry is answered in the negative, followed by step S24, in which the RATING information of the program currently selected is read by the decoder 4. The read information is then written to the memory 5 in step S25, whereupon the procedure is completed. In this way, the RATING information is set.

On the other hand, if the user depresses the setting-cancellation key with a prohibition against viewing is indicated on the screen of the CRT 8 as shown in FIG. 5, the inquiry of step S23 is answered in the affirmative. Step S26 then follows to erase the RATING information written to the memory 5, whereupon the procedure is completed. In this way, the setting of RATING information is canceled.

When a negative answer is given in step S21, step S22 inquires whether the recognition key has been depressed. If the user depresses the recognition key to display a RATING information setting frame on the screen for showing the setting of RATING information, an affirmative answer is furnished, whereupon the sequence proceeds to step S27 to set the video switch circuit 6 in the second state and feed a setting frame signal to this circuit 6, whereby the procedure is completed. As a result, the RATING information setting frame 82 shown in FIG. 6 is displayed on the screen of the CRT 8.

According to the second embodiment described, the setting procedure is performed when the setting-cancellation key is depressed while program images are being presented on the screen, whereas the cancellation procedure is executed when the setting-cancellation key is depressed while a prohibition against viewing is on display. However, this mode of setting-cancellation procedure is not limitative; it is also possible to execute the setting procedure when the setting-cancellation key is depressed with no RATING information stored in the memory 5, and to perform the cancellation procedure when the key is depressed with RATING information stored in the memory 5.

Alternatively, it is possible to execute the setting procedure and the cancellation procedure alternately every time the setting-cancellation key is depressed.

Although the present invention is embodied as television receivers according to the first and second embodiments described, the invention is not limited to this mode of application but can be applied to other video devices such as VCRs (video cassette recorders) and video disk players.

Further according to the first and second embodiments described, the present invention is embodied as television receivers for use with analog broadcast signals containing RATING information, whereas this mode of application is not limitative; the invention can be embodied as television receivers for digital broadcast signals containing viewing prohibiting information such as RATING information.

The embodiments described above are intended to illustrate the present invention and should not be construed as limiting the invention set forth in the appended claims or reducing the scope thereof. The device or receiver of the invention is not limited to the foregoing embodiments in construction but can of course be modified variously without departing from the spirit of the invention as set forth in the claims.

What is claimed is:

1. A program viewing regulation device which comprises:
    a manual key to be manipulated for setting viewing prohibiting information,
    memory means for storing viewing prohibiting information,
    information processing means for extracting viewing prohibiting information from the video signal of a program being viewed when the manual key is manipulated and storing the extracted viewing prohibiting information in the memory means, and
    control means operable when the viewing prohibiting information is stored in the memory means to check whether a prohibition is laid against viewing a program based on the stored viewing prohibiting information and viewing prohibiting information contained in the video signal of the program and to make it impossible to view the program upon finding the prohibition.

2. A program viewing regulation device according to claim 1 which further comprises:

a setting cancel key to be manipulated for canceling the setting of the viewing prohibiting information, and erase means for erasing the viewing prohibiting information stored in the memory means when the setting cancel key is manipulated.

3. A program viewing regulation device according to claim 1 which further comprises:

erase means for erasing the viewing prohibiting information stored in the memory in response to a command, and setting-cancellation control means for commanding the information processing means to extract and store the viewing prohibiting information when the manual key is manipulated in a state ready for viewing programs, or for commanding the erase means to erase the viewing prohibiting information when the manual key is manipulated in a state not ready to view programs.

4. A program viewing regulation device according to claim 1 which further comprises:

erase means for erasing the viewing prohibiting information stored in the memory in response to a command, and setting-cancellation control means for alternately commanding the information processing means to extract and store the viewing prohibiting information and commanding the erase means to erase the viewing prohibiting information, every time the manual key is manipulated.

5. A program viewing regulation device according to claim 1 which further comprises:

a display key to be manipulated to display the setting of viewing prohibiting information, and image output means for outputting a setting frame signal for visually displaying the viewing prohibiting information stored in the memory means when the display key is manipulated.

6. A television receiver equipped with a program viewing regulation device which comprises:

a manual key to be manipulated for setting viewing prohibiting information, memory means for storing viewing prohibiting information, information processing means for extracting viewing prohibiting information from the video signal of a program being viewed when the manual key is manipulated and storing the extracted viewing prohibiting information in the memory means, and control means operable when the viewing prohibiting information is stored in the memory means to check whether a prohibition is laid against viewing a program based on the stored viewing prohibiting information and viewing prohibiting information contained in the video signal of the program and to make it impossible to view the program upon finding the prohibition.

* * * * *